US009818129B2

(12) United States Patent
Anand et al.

(10) Patent No.: US 9,818,129 B2
(45) Date of Patent: Nov. 14, 2017

(54) METHODS FOR CALCULATING ADVERTISEMENT EFFECTIVENESS

(71) Applicant: Facebook, Inc., Menlo Park, CA (US)

(72) Inventors: Abheek Anand, Menlo Park, CA (US); Neville Bowers, Menlo Park, CA (US); Ram Vaidyantathan, Menlo Park, CA (US); Sohan Mazumdar, Menlo Park, CA (US); Ted Zagat, Menlo Park, CA (US); Kelly Winters, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 334 days.

(21) Appl. No.: 13/835,541

(22) Filed: Mar. 15, 2013

(65) Prior Publication Data

US 2014/0278896 A1  Sep. 18, 2014

(51) Int. Cl.
*G06Q 30/02* (2012.01)
*G06Q 50/00* (2012.01)

(52) U.S. Cl.
CPC ......... *G06Q 30/0246* (2013.01); *G06Q 50/01* (2013.01)

(58) Field of Classification Search
CPC ................................. G06Q 30/0241–30/0247
USPC .......................................... 705/14.41, 14.58
See application file for complete search history.

(56) References Cited

U.S. PATENT DOCUMENTS

| | | | | |
|---|---|---|---|---|
| 6,414,635 | B1* | 7/2002 | Stewart | G01S 5/12 342/457 |
| 6,526,335 | B1* | 2/2003 | Treyz | G01C 21/26 307/10.1 |
| 2012/0004983 | A1* | 1/2012 | Borthwick | G06Q 30/02 705/14.45 |
| 2012/0166520 | A1* | 6/2012 | Lindsay | G06Q 30/0241 709/203 |
| 2012/0316953 | A1* | 12/2012 | Ramchandani | G06K 19/0723 705/14.39 |

\* cited by examiner

*Primary Examiner* — David Stoltenberg
*Assistant Examiner* — Robert C Johnson
(74) *Attorney, Agent, or Firm* — Keller Jolley Preece

(57) ABSTRACT

One variation of a method for calculating advertisement effectiveness includes: posting an advertisement for a product to a social feed within a social networking system; tracking a view of the advertisement by a user; determining a proximity of the user to a store of a merchant; in accordance with a privacy setting of the user, selecting personal data of the user from data stored in the social networking system, the personal data including an identity of the user and an interest of the user; in response to the determined proximity of the user to the store, transmitting the selected personal data to the store; and, in response to a transaction between the user and the store, assessing an effectiveness of the advertisement according to a determined correlation between the transaction and the view of the advertisement by the user.

21 Claims, 7 Drawing Sheets

METHODS FOR CALCULATING ADVERTISEMENT EFFECTIVENESS

CROSS-REFERENCE TO RELATED APPLICATIONS

This application is related to: U.S. patent application Ser. No. 12/978,265, filed on 23 Dec. 2010 and titled "Contextually Relevant Affinity Prediction in a Social Networking System"; U.S. patent application Ser. No. 13/239,340, filed on 21 Sep. 2011 and titled "Structured Objects and Actions on a Social Networking System"; U.S. patent application Ser. No. 12/508,521, filed on 23 Jul. 2009 and titled "Markup Language for Incorporating Social Networking Information by an External Website"; U.S. Pat. No. 8,250,145, issued on 21 Aug. 2012 and titled "Personalizing a Web Page Outside of a Social Networking System with Content from the Social Networking System"; U.S. patent application Ser. No. 12/969,368, filed on 15 Dec. 2010 and titled "Comment Plug-In for Third Party System"; and U.S. patent application Ser. No. 13/167,702, filed on 24 Jun. 2011 and titled "Suggesting Tags in Status Messages Based On Social Context", all of which are incorporated in their entirety by this reference.

TECHNICAL FIELD

This invention relates generally to the field of online advertising, and more specifically to a new and useful method for calculating advertising effectiveness in the field of online advertising.

BACKGROUND

Billions of dollars are spent annually on online advertising in the United States alone with the hope that such marketing will influence viewers to purchase product. In fact, online advertising is a core source of income for many Internet-based companies, both large and small, and the anticipated or estimated effectiveness of these online advertisements in influencing viewers to transact with merchants is often cited as justification for such marketing. However, current methods for correlating advertisements with user purchases are generally poorly suited to determine a real effectiveness of a particular advertisement in influencing a user to initiate a transaction.

DESCRIPTION OF THE EMBODIMENTS

The following description of the embodiments of the invention is not intended to limit the invention to these embodiments, but rather to enable any person skilled in the art to make and use this invention.

1. Methods

Figure 1:
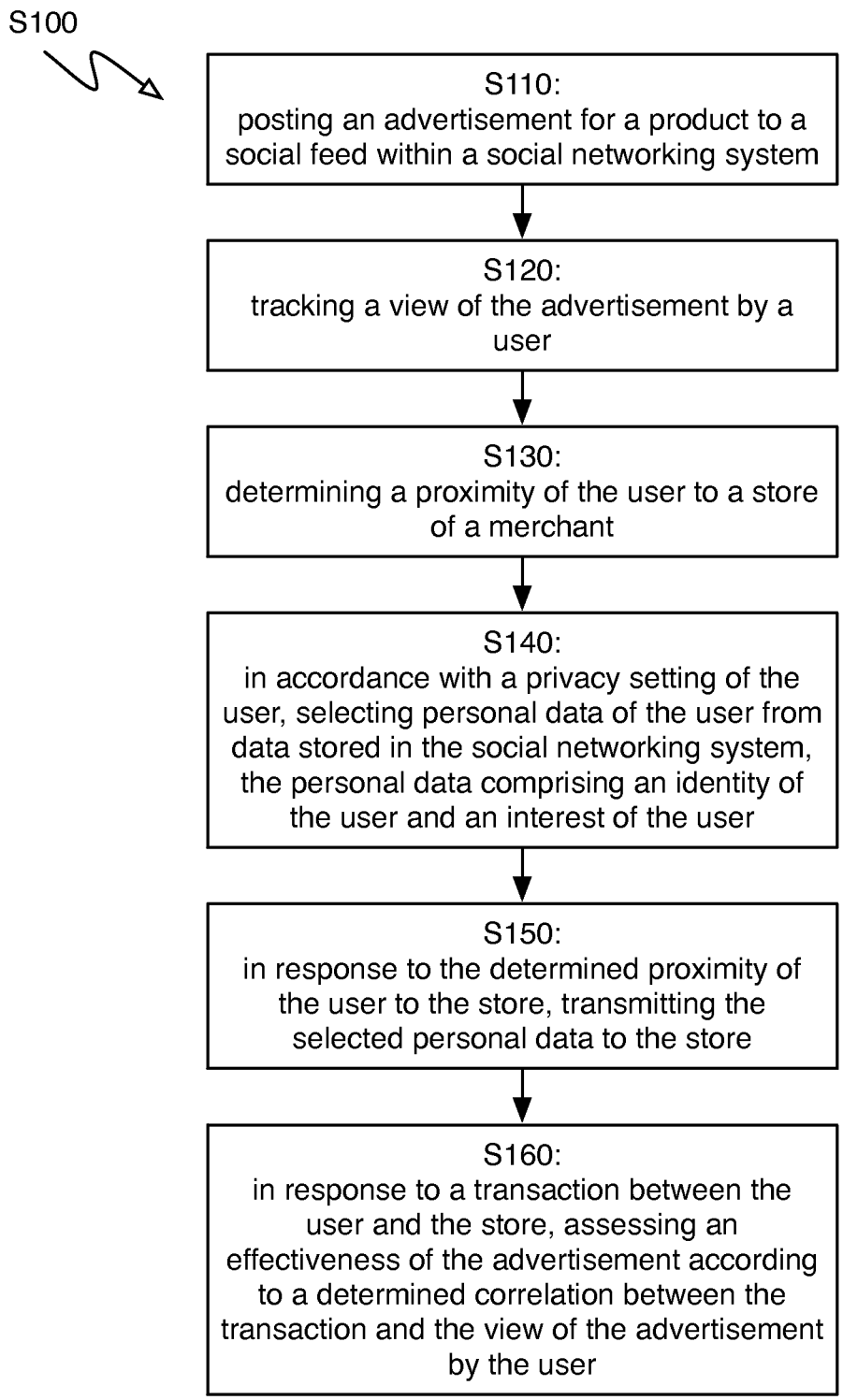
FIG. 1 is a flowchart representation of a method of one embodiment.

As shown in FIG. 1, method S100 for calculating advertising effectiveness includes: posting an advertisement for a product to a social feed within a social networking system in Block S110; tracking a view of the advertisement by a user in Block S120; determining a proximity of the user to a store of a merchant in Block S130; in accordance with a privacy setting of the user, selecting personal data of the user from data stored in the social networking system in Block S140, the personal data including an identity of the user and an interest of the user; in response to the determined proximity of the user to the store, transmitting the selected personal data to the store in Block S150; and, in response to a transaction between the user and the store, assessing an effectiveness of the advertisement according to a determined correlation between the transaction and the view of the advertisement by the user in Block S160.

Generally, method S100 functions to advertise a product to a social feed that is accessible to a user from within a social networking system, to communicate user data to a physical store of a merchant when the user approaches or enters the store, and to correlate a transaction between the user and the merchant with an effectiveness of the advertisement. By posting the advertisement for a product to the social networking system, identifying a user's observation of the advertisement ('a user advertising event'), and collecting information regarding purchase of the product by the user, method S100 can estimate the effect that the advertisement had in promoting the product to the user. Similarly, by posting the advertisement for a brand to the social networking system, identifying a user's observation of the advertisement, and collecting information regarding a user purchase of a product of the brand, method S100 can estimate the effect that the advertisement had in promoting the brand to the user. And yet similarly, by posting the advertisement for a store or merchant to the social networking system, identifying a user's observation of the advertisement, and collecting information regarding a transaction between the user and the store or merchant, method S100 can estimate the effect that the advertisement had in promoting the store or merchant to the user. Generally, the 'merchant' can include any of a brand, local boutique, local retailer location, local franchise, local market, or any other suitable entity offering or selling products at any one or more brick-and-mortar stores. The product can be any tangible good, such as an article of clothing, a paperback book, or a pair of sunglasses, or the product can be any suitable service, such as a massage, airline flight, or hotel room stay.

Furthermore, by communicating user data to the physical store, method S100 can enable the store to offer a personalized shopping experience for the user. For example, method S100 can communicate the name and age of the user ad a picture of the user to the merchant such that a representative of the store who is a peer of the user can identify and greet the user by name. Method S100 can additionally or alternatively communicate a need, interest, social networking "like" history, purchase history, "friend" purchase history, or any other relevant data to the merchant, the merchant thus able to implement the data to guide the user toward one or more in-store products that may be particular interesting to the user and/or which the user is particularly likely to purchase.

Therefore, method S100 can implement direct and/or indirect two-way communication between the merchant and the social networking system to estimate advertising effectiveness and/or to customize the user's shopping experience in the store. Method S100 can further communicate with a mobile computing device (e.g., smartphone) carried by the user to collect user location (e.g., GPS) data or user check-in data and thus determine the user's proximity to the store.

Method S100 can be implemented by a computer system, such as an advertising platform within a social networking system that posts curated advertisements to social feeds, tracks user views of elements of social feeds (e.g., based on user privacy settings), and interfaces with an external merchant to send and receive user and transaction data. The computer system can be a cloud-based computer (e.g., Amazon EC3), a mainframe computer system, a grid-computer system, or any other suitable computer system. As described above and shown in FIG. 5, the computer system can support communication of advertisements, user data, transaction data, etc. between the social networking system, the merchant, a payment processing service, and a computing device associated with the user. For example, the computer system can receive and distribute data over a distributed network, such as over the Internet, and one or more processors throughout the distributed network can implement one or more Blocks of method S100. The computer system can also incorporate a user interface, a merchant interface, and/or a brand interface. For example, the brand (or merchant) can access the brand (or merchant) interface to upload an advertisement to a social feed curated by the brand (or merchant), the user can access the user interface to review the social feed of the brand (or merchant), and the merchant can access the merchant interface to collect user data when the user enters, is near, or walks into the store. The user, merchant, and/or brand interfaces can each be accessible through a web browser, through a native application executing on a computing device (e.g., a laptop computer, a desktop computer, a tablet, a smartphone, a personal data assistant (PDA), a personal music player, etc), through enterprise, sales, or management software, etc., any of which can be internal or external the social networking system.

Method S100 can be implemented through (or interface with) a social networking system (e.g., Facebook) that enables advertising to social network users (including the user) and receives user check-ins and/or location data (e.g., according to user privacy settings). The social networking system can also contain other relevant user data, such as name, age, gender, relationship status, demographic information, interest, favorite book, brand, or movie, etc., and the social networking system can further (selectively) share this data with the merchant, such as based on the user's privacy settings. Additionally or alternatively, method S100 can be implemented directly by a merchant or brand, an online picture-sharing service or media aggregator, or any other suitable online or brick-and-mortar entity that advertises product and/or transacts over advertised products. However, method S100 can be implemented by any other computer system, service, network, etc. and can include any other interface to support advertising, data collection, data sharing, and data analysis.

Figure 5:
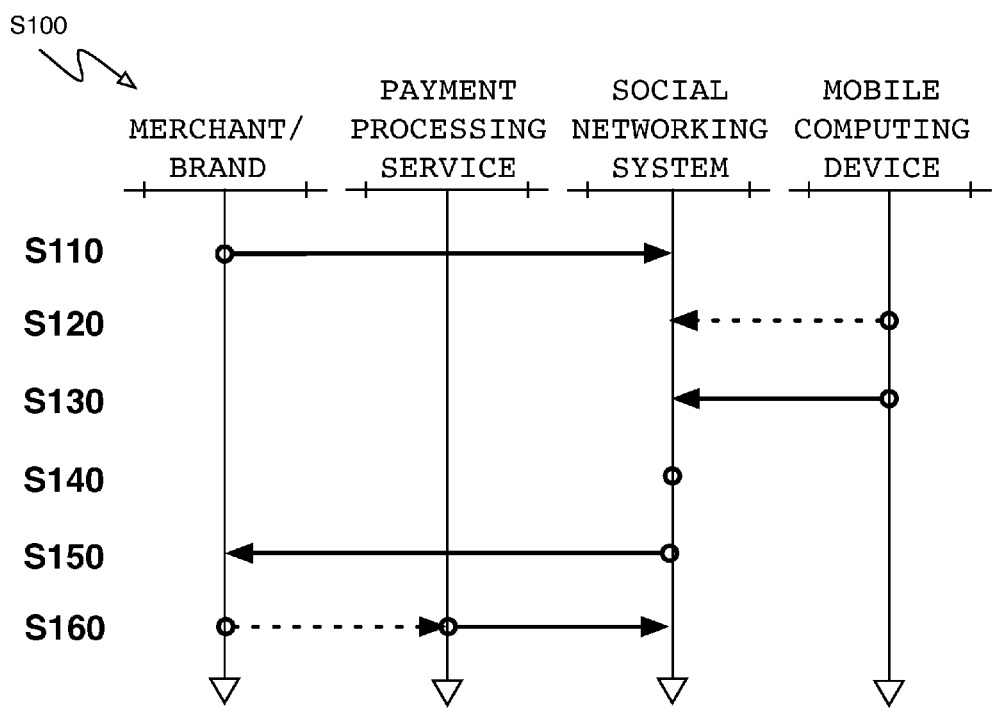
FIG. 5 is a flowchart representation of one variation of the method.

Method S100 can also interface with multiple entities to implement one or more Blocks of method S100. For example, method S100 can be implemented by an application or "app" through a social networking system, wherein the application controls distribution of the advertisement within the social networking system (e.g., in Block S110), downloads user data from the social networking system to track user advertising events (e.g., in Block S110) and to select user data (e.g., in Block S140), retrieves user location data from a server in communication with a GPS satellite (e.g., in Block S130), interfaces with a merchant server to push user data to the store via the Internet (e.g., in Block S150), and retrieves user/store transaction data from a payment processing service (e.g., in Block S160). Alternatively, method S100 can be implemented by multiple entities in cooperation. For example, as shown in FIG. 5, the social networking system can control distribution of the advertisement to one or more social feeds (e.g., in Block S110), track user advertising events (e.g., in Block S120), select user data (e.g., in Block S140), collect a user check-in at or near the store (e.g., in Block S130), such as through a mobile computing device, and push user data to the store over an Internet connection (e.g., in Block S150). In this example, the store can receive and implement the user data to customize the user's shopping experience, and a payment processing service can handle a transaction between the user and the shop, retrieve user advertising event data from the social networking system, and determine the effectiveness of the advertisement (e.g., in Block S160). However, method S100 can be implemented by any other one or more entities working independently or in cooperation and communicating data in any other suitable way.

Block S110 of method S100 recites posting an advertisement for a product to a social feed within a social networking system. Generally, Block S110 functions to load an advertisement for at least one of a product, a brand, and a merchant to a social feed within the social networking system, as shown in FIG. 5. As described above, the product can be a good or service. Similarly, the brand can be an entity that manufactures, designs, distributes, etc. the product. Furthermore, the merchant can be an entity that owns, licenses, operates, etc. a physical storefront to transact directly with a customer, thereby providing the product.

Block S110 can post the advertisement that publicizes a new product, a product that is on sale or discounted, a product that is currently or will be available for sale, a brand or a division of a brand, a store that carries a product, a merchant with multiple store locations, or any other product-, brand-, store-, and/or merchant-related information, etc.

Figure 3:
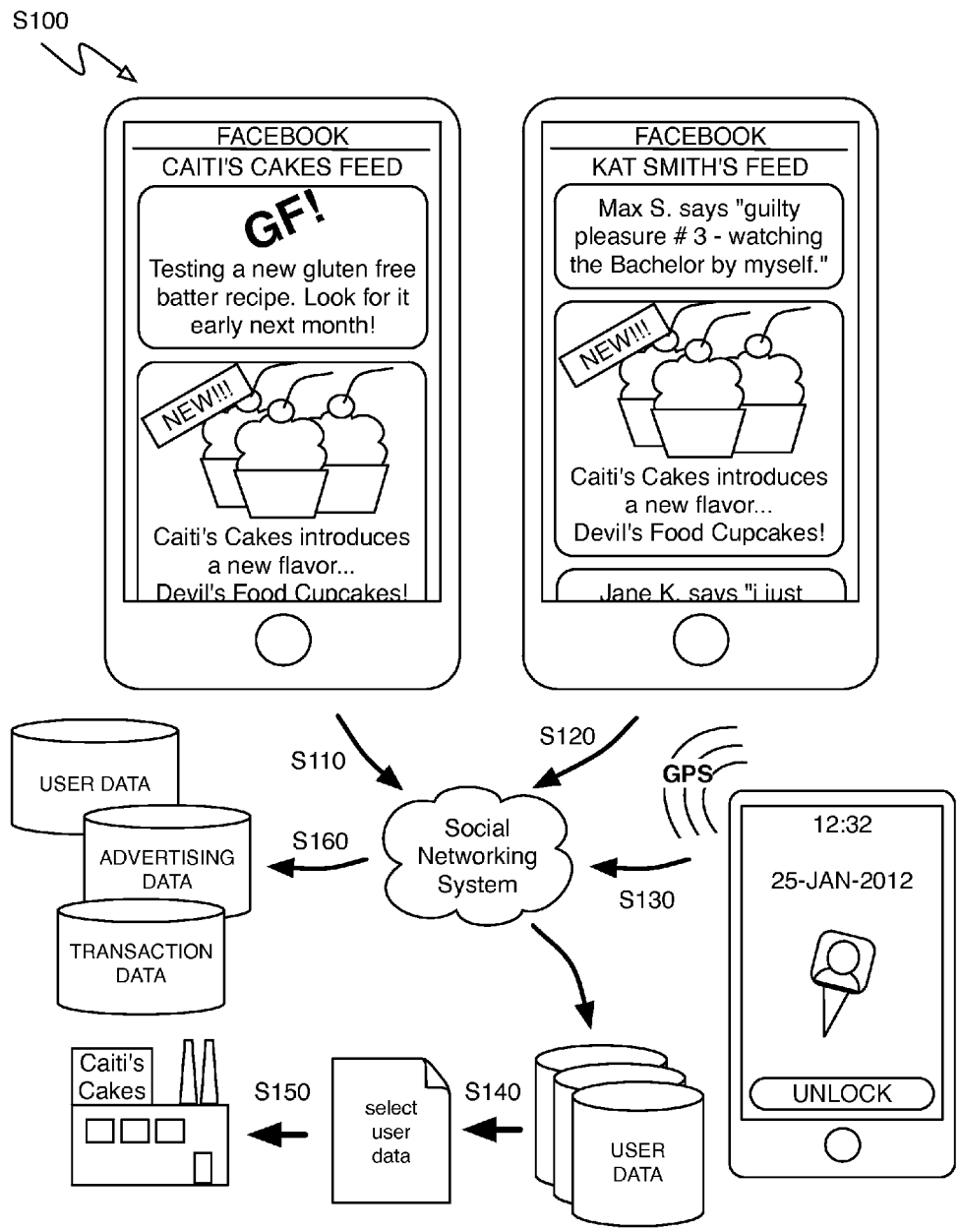
FIG. 3 is a flowchart representation of one variation of the method.
Figure 4:
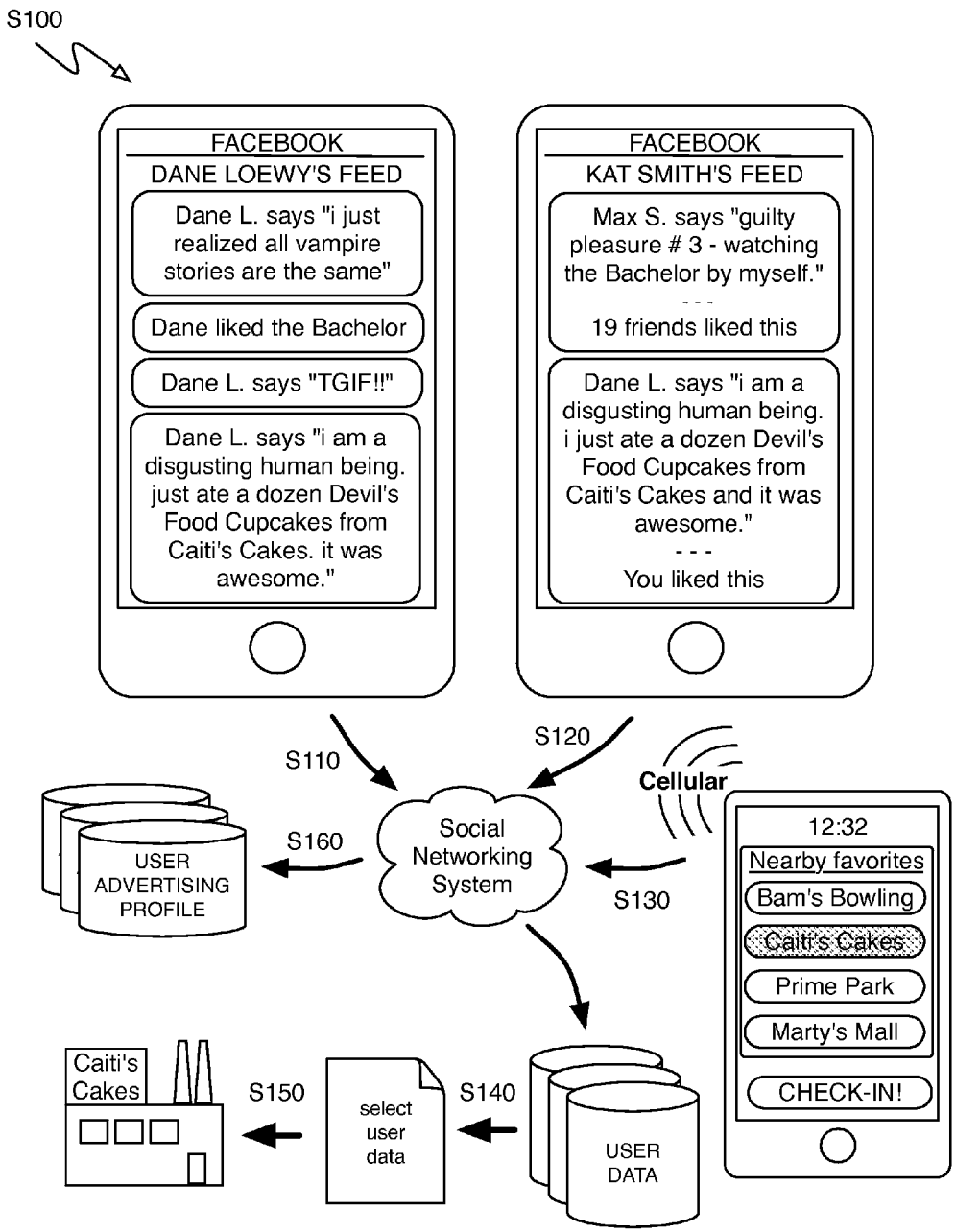
FIG. 4 is a flowchart representation of one variation of the method.

As shown in FIG. 3, Block S110 can post the advertisement to the social feed that is a feed curated by the merchant or by the brand, wherein the user can access the feed of the merchant or the brand through the social networking system to review the advertisement. For example, the user can subscribe to a profile of the merchant or the brand and thereby gain 'limited' or 'exclusive' access to posts (e.g., advertisements) on the merchant's or brand's social feed. Additionally or alternatively, Block S110 can post the advertisement to the social feed that is a personal feed of the user. For example, as shown in FIG. 3, the user can subscribe to the merchant, to the brand, or to the product within the social networking system, and the social networking system can push the advertisement to the user's social feed once uploaded by the merchant or brand. Yet additionally or alternatively, as shown in FIG. 4, Block S110 can post the advertisement to the social feed that is a feed curated by a second user, such as a second user who is a "friend" of, a connection of, or otherwise linked to the user within the social networking system. In any of the foregoing implementations, Block S110 can thus load the advertisement to a social feed within the social networking system, the advertisement available to the user for review by accessing the social feed.

The advertisement, posted to the social feed through Block S110, can include an image of the product, a name or description of the product, a logo or branding of the product, product line, brand, or merchant, etc. The advertisement can therefore include any of a static image, a video, an audio signal, text, etc. that can be posted to and accessed from a social feed within the social networking system. As shown in FIG. 3, the advertisement can be a professional (e.g., official) advertisement, such as generated by the merchant and/or brand as part of a marketing campaign for the merchant, the brand, the product, a product line, or a particular store location. Alternatively, as shown in FIG. 4, the advertisement can be an amateur (e.g., unofficial) advertisement, such as no more than a video, picture, or textual note that references or includes content related to the merchant, brand, product, product line, store location, etc. For example, the advertisement can be created by second user who is a friend or other connection to the user within the social networking system. The advertisement can thus include a digital photograph of a store, a branded billboard, a sign, the product, etc. captured by the second user through a camera integrated into a mobile computing device (e.g., smartphone, tablet) carried by the second user. The second user can also tag the image with the merchant, brand, product, product line, etc. in order to link the advertisement to the merchant, brand, product, product line, etc. The second user can additionally or alternatively compose and post a textual message to the social networking system, such as to the social feed or profile of the second user, the brand, or the merchant. However, the advertisement can be any other type, can include any other information, tags, or metadata, and can be created in any other way by any other entity.

Once the advertisement is created by the second user, the merchant, the brand, etc., Block S110 can upload the advertisement to the social networking system. Block S110 can thus post the advertisement to one or more of a feed of the brand, a feed of the merchant, a feed of the store location, a feed associated with the product line, a personal feed of the second user, a personal feed of the user, and/or any other suitable feed within the social networking system. Block S110 can also repost the advertisement from one social feed to another social feed, thereby propagating the advertisement through the social networking system. For example, the second user can manually repost the advertisement from the merchant's feed to his own social feed. However, Block S110 can post an advertisement for a product to a social feed within a social networking system in any other suitable way.

Figure 2:
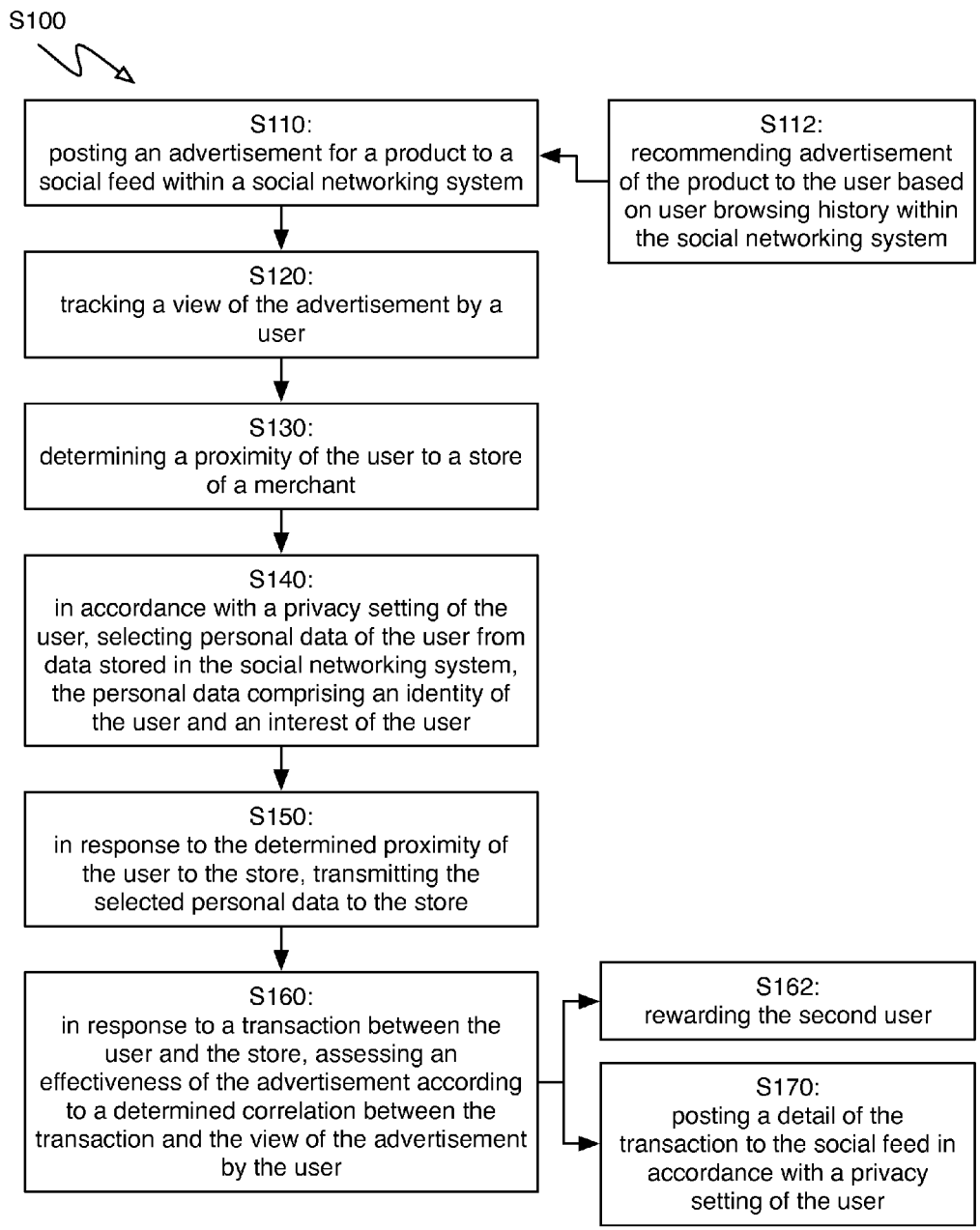
FIG. 2 is a flowchart representation of one variation of the method.

As shown in FIG. 2, one variation of method S100 includes Block S112, which recites recommending advertisement of the product to the user based on user browsing history within the social networking system. Generally, Block S112 functions to guide targeted advertisement of the product, merchant, brand, etc. to the user according to a perceived interest of the user based on user data stored by the social networking system. By identifying a user interest, a user need, or an interest or need of one or more of the user's connection within the social networking system, Block S112 can enable Block S110 to selectively target particular advertisements to the user, the particular advertisements particularly relevant to the user and substantially likely to result in a conversion (i.e. transaction between the user and the store).

In one example, Block S112 identifies a user interest or need based on a positive user response to a previous post on a social feed within the social networking system, wherein the previous post specifies an item similar to the product identified in the advertisement. In this example, Block S112 estimates current user interest in a product based on past user interest in a similar product. In another example, Block S112 accesses a user's subscription to the merchant's feed within the social networking system and from this estimate the user's interest in the merchant. In a further example, Block S112 analyzes the user's personal data stored by the social networking system (e.g., according to the user's privacy settings) to determine the relevance of the advertisement to the user. In this example, Block S112 can analyze a favorite author, book, movie, designer, brand, or store of the user, a store or location frequented by the user, prior user purchases, prior online search strings entered by the user, the user's browsing history, and/or a social networking "app" or game installed on the user's social networking profile, etc. to estimate a user interest or need. Block S112 can additionally or alternatively analyze a favorite author, book, movie, designer, brand, or store of an other user, a store or location frequented by the other user, prior purchases by the other user, prior online search strings entered by the other user, the other user's browsing history, a social networking "app" or game installed on the other user's social networking profile, and/or a strength or degree of connection between the user and the other user, etc. to predict an interest or need of the other user and, by association, an interest or need of the user. Block S112 can subsequently manipulate this estimate user interest or need to determine the relevance of the advertisement and thus recommend (e.g., to the merchant, to the brand, to the social networking system) advertisement of the product to the user through one or more social feeds. Block S112 can alternatively directly trigger Block S110 to post the advertisement to the user's personal social feed and/or to a social feed within the social networking system substantially likely to be viewed by the user. As described above, the advertisement can be an official advertisement curated by the merchant, brand, etc. or an unofficial advertisement created by a second user. However, Block S112 can function in any other way to control advertisement of the product to the user based on a determined user interest in the advertised product, merchant, brand, etc.

Block S120 of method S100 recites tracking a view of the advertisement by a user. Generally, Block S120 functions to track the user's exposure to the advertisement within the social network. In particular, Block S120 can record a time, date, and/or length of an advertising event in which the advertisement is visually (and/or audibly) displayed to the user, such as through a display (or speaker) incorporated into a smartphone or tablet or coupled to a desktop computer. For example, as shown in FIG. 3, when a user accesses his personal social feed, a social feed of the merchant, or a social feed of the brand, etc., Block S120 can record a length of time that the advertisement is displayed to the user through the social feed.

If the length of time is less than a threshold comprehension time, such as three seconds, Block S120 can ignore the viewing as a user advertising event since user would have been unlikely to comprehend the advertisement in less than the threshold time. However, if the length of time is greater than the a threshold comprehension time, Block S120 can record the viewing as a user advertising event, and Block S120 can further tag the event with the time, date, and/or length of time of the viewing. Block S120 can also set the threshold comprehension time. In one implementation, the threshold comprehension time is static (i.e. the same) for all users at all times, such as three seconds. In another implementation, the threshold comprehension time is varied among users but static for a single user at all times, such as three seconds for a teenage user and six seconds for a user in his sixties. In yet another implementation, the threshold comprehension time is dynamic across time and users, such as three seconds during the daytime and four seconds at night for a teenage user and six seconds during the daytime and eight seconds at night for a user who is in his sixties. However, Block S120 can set the threshold and identify a user advertising event in any other way.

Block S120 can identify instances in which the user views the advertisement through any one or more of a smartphone, a tablet, a laptop computer, a desktop computer, and personal data assistant (PDA), an MP3 player, an Internet-capable watch, or any other suitable computing device. Block S120 also record repeat user views of the same advertisement, such as on the same or different social feeds within the social networking system (e.g., the brand's social feed and the second user's social feed), and/or user views of different advertisements for the same merchant, brand, product, etc. (e.g., an official advertisement posted on the brand's feed and an unofficial advertisement posted on the second user's feed). Block S120 can additionally or alternatively record user responses to advertisements, such as in the form of "likes," "reposts," or "repins" of the advertisements, as shown in FIG. 4. Block S120 can further tag a recorded user advertising event with content of the viewed advertisement, such as a brand, merchant, product, etc. identifiable in the advertisement, a form or type of the advertisement (e.g., static image, video), colors, fonts, design, or style of the advertisement, or any other advertisement-related data. However, Block S120 can function in any other way to track and record a user advertising event and related data.

Block S130 of method S100 recites determining a proximity of the user to a store of a merchant. Generally, Block S130 functions to determine or estimate a current location of the user such that user data can be pushed to the local store in a timely manner, thereby enabling the store and/or a representative thereof to customize the user's shopping experience within the store. In one implementation, as shown in FIG. 3, Block S130 collects location data from a global positioning system (GPS) sensor arranged within a mobile computing device (e.g., smartphone) associated with the user (e.g., by a phone number linked to the user's social networking profile) to estimate the location of the user. Similarly, Block S130 can triangulate the mobile computing device amongst local cellular towers to estimate the location of the user. For example, Block S130 can pair (GPS or cellular) location data of the mobile computing device with a known location of the store to determine proximity of the user to the store. In another implementation, as shown in FIG. 4, Block S130 can analyze a "check-in" manually entered into the social networking system by the user to estimate a location of the user. In this implementation, Block S130 can receive a user check-in at the store, or Block S130 can receive a user check-in at an other location and compare the other location to a known location of the store to determine proximity of the user to the store. For example, the user can check-in to a local restaurant, store, theatre, stadium, event, beach, public transportation, office or office building, etc. of known location or known route, and Block S130 can estimate a current location (e.g., for a check-in at a building of known location) or a future location (e.g., for a check-in on a bus of known route) of the user based on the check-in. In a further implementation, Block S130 can extract times and locations of future user actions from calendar items in the user's electronic calendar to predict a future time and date on which the user will be near or in the store. However, Block S130 can function in any other way to determine a current or future proximity of the user to a store of a merchant.

Block S140 of method S100 recites selecting personal data of the user from data stored in the social networking system in accordance with a privacy setting of the user. Generally, when the user is in the store, when the user's entry into the store is imminent, or when the user is near the store and may soon enter the store, Block S140 functions to collect user information potentially relevant to the user's shopping experience within the store in preparation for distribution of relevant user data to the store in Block S150. For example, Block S140 can select an identifier or identify of the user, the user's response to the advertisement, and/or a determined user interest.

Block S140 can filter through data stored on the social networking system to select user data particularly relevant to the user's experience in the store. For example, the social networking system can store a profile of the user, which can include a name, a birth date, a hometown, education details, an occupation, music interests, favorite books or authors, favorite movies or actors, favorite music, film, or book genres, a hobby, a marital or relationship status, and/or any other personal user information. The social networking system can also store user actions within the social networking system, such as "likes," "pins," "posts," or other comments or communications made by the user on his personal social feed or any other private or public feed within the social networking system. The social networking system can also store connections or relationships between the user and the other users within the social networking system, such as friends, coworkers, or family members of the user. Block S140 can then select particular data from this collection of user data collected by and/or stored on the social networking system. Block S140 can additionally or alternatively analyze any of this data to extrapolate a user interest (e.g., in a particular brand, merchant, or product), such as based on a positive user response to the advertisement and/or other post within the social networking system or based on responses or interests of friends or peers of the user as recorded on the social networking system.

Block S140 can select information relevant to the particular store. In one example implementation, for the store that is a bookstore, Block S140 can select a profile picture and a favorite book of the user. In this example implementation, Block S140 can further interface with a publication database to identify the book's author and select this information to be transmitted to the store. In another example implementation, for the store that is a café, Block S140 can select the user's first name and a preferred coffee drink (e.g., black coffee, latte, espresso) of the user. In this example implementation, Block S140 can select a manually-entered drink preference, or Block S140 can analyze previous comments posted to the social network by the user to identify a coffee drink commonly ordered by the user. For example, Block S140 can determine that the user prefers lattes based on recent comments posted by the user, including one that reads "so happy—Sunday morning with a latte and a good book" and "rough day, but now it's break time for a latte." In another example implementation, for the store that is a clothing store, Block S140 can select the user's first name, pant size, shirt size, style, and favorite type of accessory. As in the forgoing example implementation, Block S140 can collect this information from data entered manually by the user. Alternatively, Block S140 can extrapolate this information from private messages (e.g., between the user and a "friend"), posts, comments, "likes" or other data or actions entered into the social networking system by the user.

Block S140 can implement similar techniques to identify a user need based on personal data stored in the social networking system. For example, if the user posts that she recently birthed a child, Block S140 can determine that the user is a new mother and will likely require diapers, toys, and bottles. Block S140 can thus communicate this information to a department store, such as to aid the store in directing the user through the store to finds these items.

Block S140 can additionally or alternatively select the user's response to the advertisement. For example, Block S140 can select how long and how many times the user viewed the same advertisement or different advertisements for the same product, merchant, brand, etc. Block S140 can also select content communicated to the user through the advertisement, such as a merchant, product, or offer identifiable in the advertisement, to inform the store of what the user knows about the merchant, product, etc. For example, the merchant can post an advertisement for a 10% discount on a purchase on its social feed, Block S140 and Block S150 can supply the merchant with data indicating whether or not the user viewed the advertisement for the discount, and the merchant can implement this data by applying the discount for the user who has viewed the advertisement and by withholding the discount for the user who has not viewed the advertisement. In this example, method S100 can thus enable the merchant to incentivize traffic to the merchant's social feed by providing limited offers based on real data pertaining to user advertisement views.

Block S140 can additionally or alternatively extrapolate a user's interest in the product, merchant, brand, etc. based on the user's response to the advertisement and select this extrapolated information to send to the store. For example, Block S140 can estimate that a first user has a high interest in a product if he likes and reposts the advertisement for the product on his own social feed, Block S140 can estimate moderate interest in the product if a second user has viewed several advertisements for the product and "liked" one advertisement, and Block S140 can estimate negligible interest in the product by a third user if the third user repeatedly scrolls passed and ignores advertisements for the product. In these examples, Block S140 can select the perceived interest levels for subsequent transmission to the store, thereby enabling the store or representative thereof to target the product and others to the first user, to focus the attention of the second user specifically to the product, and to draw the attention of the third user to any other product. Therefore Block S140 can determine an interest of the user based on a user response to the advertisement and select the determined interest of the user to send to the store. However, Block S140 can select any other user information relevant to the store in customizing or augmenting the user's shopping experience.

Block S140 can further analyze user data, user needs, user interests, etc. to define a target user experience customized for the store and to select user data accordingly. For example, for the user who recently acquired a puppy, Block S140 can define the target user experience in a department store that includes access to dog toys and dog food while in the store, and for the user who recently lost a dog, Block S140 can define the target user experience in the department store that avoids dog toys and other references to dogs. In another example, for the user who prefers classic, vintage modern, hardwood furniture to contemporary "ebonized" furniture made of plastic or engineered woods, Block S140 can define the target user experience in a furnishings store that directs the user to particular quality items and avoids cheaper, more synthetic pieces. In yet another example, for the user who prefers science fiction novels, Block S140 can define the target experience in a bookstore that includes interacting with a bookstore representative who is particularly knowledgeable about science fiction novels. Block S140 can thus select the target user experience and/or related user data to send to the store. However, Block S140 can define a target user experience and select user data to send to the store in any other way or according to any other schema.

As described above, Block S140 can also select an identifier or identity of the user. For example, Block S140 can select the user's first, last, or full name, a static image (e.g., a profile picture) of the user, or a description of the user (e.g., gender, height, hair color, eye color). By selecting such identification information in Block S140 and communicating this identification information to the store in Block S150, method S100 can thus enable the store and/or a representative of the store to identify the user and thus implement a customized or augmented shopping experience for the user.

Block S150 of method S100 recites transmitting the selected personal data to the store in response to the determined proximity of the user to the store. Generally, Block S150 functions to communicate the user's response to the advertisement to the store when the user is in the store, when the user's entry into the store is imminent, or when the user is near the store and may soon enter the store. Block S150 can additionally or alternatively communicate any other data selected in Block S140 to the store and according to any other timing.

In one implementation Block S150 transmits the selected data, from a remote server that stores data for and/or implements a functionality of the social networking system, to another server that stores data for and/or enables a functionality of the merchant, wherein the merchant server distributes the data to the local store, a department within the store, or a particular representative of the store. In another implementation, Block S150 transmits the data directly to the local store. In a further implementation, Block S150 transmits the data to a particular store department or to a particular store representative relevant to the user. For example and as described above, Block S140 can determine that the user prefers science fiction novels, and Block S150 can transmit all or a portion of the data to a mobile computing device allocated to a representative of the store specializing in science fiction novels, thereby enabling the user to substantially immediately access a representative potentially most helpful to the user.

Block S150 can communicate the user's data over the Internet or via any other distributed network or system. For example, Block S150 can communicate the data over a wired or a wireless (e.g., Wi-Fi, cellular) Internet connection at any one or more stages of data transfer, such as from the social networking system's server to the merchant's server, from the merchant's server to the local store's server, from the local store's server to a department within the store, and/or from the department within the store to a particular store representative. Furthermore, Block S150 can implement encryption and/or authentication schema to protect the user's data at any stage of communication to the store. For example, Block S150 can implement cryptographic protocols such as Diffie-Hellman key exchange, Wireless Transport Layer Security (WTLS), or any other suitable type of protocol. Block S150 can also encrypt data according to an encryption standard, such as the Data Encryption Standard (DES), Triple Data Encryption Standard (3-DES), or Advanced Encryption Standard (AES).

As described above, Block S150 can trigger delivery of user data to the store when the user is in the store, when the user's entry into the store is imminent, or when the user is near the store and may soon enter the store. For example, Block S150 can communicate the data to the store substantially in real time when Block S130 determines that the user is in the store (e.g., via a user check-in or via user GPS data). Block S150 can also communicate the data to the store prior to the user's entry into the store. For example, Block S150 can communicate the data to the store when the user is within a threshold distance of the store. In this example, the threshold distance can be a static predefined distance, such as 500 ft from a front door of the store, or dynamic or adaptable, such as 300 ft from the front door if the user is walking and 1000 ft if the user is driving, 100 ft from the front door if the store is in a mall adjacent several other stores and 500 ft if the store is substantially removed from other stores, or 300 ft from the front door of the store on a Saturday afternoon and 100 ft on a Wednesday afternoon approaching rush hour. In another example, Block S150 can communicate the data to the store substantially regardless of when Block S130 anticipates that the user will enter the store, such as based on a calendar event set by the user or user shopping habits gleaned from past user location data and/or purchase history. However, Block S150 can communicate data selected in Block S140 to the store in any other way and according to any other trigger or timing.

Block S160 of method S100 recites, in response to a transaction between the user and the store, assessing an effectiveness of the advertisement according to a determined correlation between the transaction and the view of the advertisement by the user. Generally, Block S160 functions to identify a link between a user transaction with the local store and the advertisement viewed on the social feed by the user. By drawing a correlation between the advertisement and the transaction, Block S160 can thus estimate an effectiveness of the advertisement in initiating a user purchase. For example, a low correlation between the user transaction and the advertisement can indicate a low effectiveness of the advertisement, whereas a high correlation can indicate a highly-effective advertisement. Block S160 can collect transaction data directly from the store or from the merchant, or Block S160 can interface with a payment processing system to collect all or a portion of the transaction data.

In one example implementation, Block S160 correlates the transaction with a user advertising event based on a similarity between an object of the transaction and content of the advertisement. For example, Block S160 can access transaction data specifying a product purchased by the user from the store, compare the product in the advertisement to the purchased product, and determine a high degree of correlation if the transacted product and the advertised product match, some correlation if the transacted product and the advertised product are similar (e.g., a similar sweater from different brands, a coupe model rather than a convertible model of an advertised automobile), and no correlation if the transaction bucket does not include a product similar or identical to the advertised product. In another example, Block S160 can identify the store as an object of the advertisement, access a transaction between the user and the store, and thus determine a high degree of correlation between the purchase and the advertisement. In a further example, Block S160 can identify a brand and a product of the brand as objects of the advertisement and access a transaction between the user and the store, the transaction specifying user purchase of a different product from the same brand. In this example, Block S160 can still determine a suitable degree of correlation between the purchase and the advertisement because the user purchased a product by the advertised brand and despite a mismatch between the advertised product and the purchased product.

Block S160 can also estimate a probability of a transaction between the user and the merchant, a probability of a purchase of an advertised product by the user, a probability of a purchase of a product from an advertised brand, etc. prior to the user advertising event, such as based on product, brand, merchant, and/or store purchasing habits of the user or a user transaction history with the merchant or store. Block S160 can then implement this estimated probability to determine a correlation between a user advertising events and a subsequent user transaction. For example, if the user regularly purchased sirloin steaks from a particular local butcher prior to viewing an advertisement for sirloin steaks from the particular local butcher, Block S160 can determine a relatively low correlation between an additional sirloin steak purchase by the user following a user review of the advertisement. However, in this example, if the user commonly purchases sirloin steaks on Sundays but purchased a sirloin steak on a Tuesday soon after a user advertising event specifying the butcher, Block S160 can determine a substantially greater degree of correlation between the advertisement and the transaction. In another example, if the user commonly purchased items by Brand X but recently purchased an item from Brand Y soon after viewing an advertisement for Brand Y, Block S160 can determine a relatively high degree of correlation between a user view of an advertisement for Brand Y and the user's purchase of a Brand Y product. However, in this example, if the user commonly purchases items from Brand X but does occasionally purchase products from Brand Y, Block S160 can determine that the user's purchase of the Brand Y product was relatively predictable and thus output a relatively low degree of correlation between the user view of the advertisement for Brand Y and the user's purchase of the Brand Y product. In yet another example, if the user rarely visits or completes a transaction with the store, Block S160 can determine a relatively high degree of correlation between a user advertising event for the store (or a brand or product carried by the store) and a subsequent user transaction with the store. However, in this example, if the user visited the store just before viewing the advertisement (e.g., to test drive a vehicle or a pair of boots) and then returned to the store just after viewing the advertisement (e.g., to purchase the vehicle or the pair of boots), Block S160 can assign only a moderate or even a low degree of correlation between the advertisement and the user's purchase.

Block S160 can further determine a correlation between the transaction and multiple views of the same advertisement and/or views of different advertisements for the same product, merchant, brand, etc. As described above, Block S120 can track multiple user advertising events and user responses to the user advertising events over time, and Block S160 can analyze the user responses in light of the user transaction to estimate an effectiveness of each subsequent advertisement. For example, Block S160 can estimate (or extrapolate) a threshold number of advertisements that the user must view before acting on an advertisement, such as by purchasing an advertised product, a product from an advertised brand, or a product from an advertised store. As advertisements for other products, brands, stores, etc. are advertised to the user and the user acts on various advertisements by transacting with one or more stores or merchants, Block S160 can aggregate advertising thresholds of the user, such as based on a store, brand, product type, time, etc., to assemble an advertising profile of the user, as shown in FIG. 4. The user's advertising profile can thus enable future targeted advertisement to the user, such as by targeting more ads to a user with a higher advertising threshold and reducing the number of ads targeted to a user with a lower advertising threshold, thereby enabling more efficient placement of advertisements (e.g., within the social networking system). Additionally or alternatively, Block S160 can aggregate advertising thresholds of multiple users, such as based on age, gender, education, occupation, location, or other demographic, to assemble advertising profiles of particular demographics. For example, demographic-based advertising profiles can enable future targeted advertisements to users of a known demographic(s) but with minimal transaction/advertising history.

Block S160 can also estimate an effectiveness of the advertisement relative to how the advertisement is presented to the user. For example, Block S160 can compare a user response to an official advertisement posted to a social feed of the merchant, store, or brand to a user response to the official advertisement posted to a social feed of a second user who is a "friend" of the user or otherwise connected to the user within the social networking system. For example, Block S160 can assign greater advertising effectiveness to an advertisement viewed on the second user's social feed than to an advertisement viewed on a brand's social feed if a user transaction occurs after user advertising events on social feeds of both the brand and the second user but not after a user advertising event on the social feed of only the brand. Block S160 can thus incorporate social pressure into a user's advertising profile, such as based on posts, comments, reviews, etc. of the user's connections within the social networking system that are correlated with subsequent user transactions. Block S160 can similarly compare the effectiveness of official and unofficial advertisements on user transactions. Block S160 can thus augment the user's advertising profile with an estimated effectiveness of different advertising types (e.g., official, unofficial), as well as the content, form, or other advertising variable. However, Block S160 can function in any other way to correlate an advertisement with a user transaction, assess an effectiveness of the advertisement, output an advertising profile of the user, or manipulate user, advertisement, and transaction history.

As shown in FIG. 2, in one variation of method S100 in which Block S110 posts the advertisement to the social feed of a second user, method S100 can further include Block S162, which recites rewarding the second user. Generally, Block S162 functions to recognize (e.g., reward) the second user for his role in advertising the merchant, the brand, the product, the product line, the store, etc. to the user. In one implementation, Block S162 rewards the second user in response to a user advertising event on the second user's social feed. In another implementation, Block S162 rewards the second user according to a determined correlation between a user transaction and a user advertising event on the second user's social feed. In this implementation, the magnitude of the reward delivered to the second user in Block S162 can be proportional to the determined correlation between the transaction and the advertisement (e.g., from Block S160). Similarly, the second user can be rewarded to a greater degree if the user purchased a product advertised on the second user's social feed if Block S120 does not identify a user advertising event on another social feed than if Block S120 does identify a user advertising event on another social feed.

In one implementation, Block S162 rewards the second user with one or more loyalty points redeemable through the merchant based on the view of the advertisement by the user. For example, the second user can redeem the loyalty points (s) for a free item from the merchant or a discounted purchase from the merchant. In another implementation, Block S162 can reward the second user with "clout" or other influence within the social networking system based how the posts on the second user's social feed influence purchasing behavior of other users within the social networking system (e.g., the user). For example, Block S162 can adjust how the second user is ranked searches by other users within the social network and/or adjust a how post by the second user are ranked in an aggregated news feed of posts by multiple users within the social network based on a degree of correlation between a user advertising event on the second user's social feed and a user transaction. However, Block S162 can reward the second user in any other way and according to any other schema.

Figure 6A:
FIGS. 6A and 6B are a graphical representations in accordance with variations of the method.
Figure 6B:
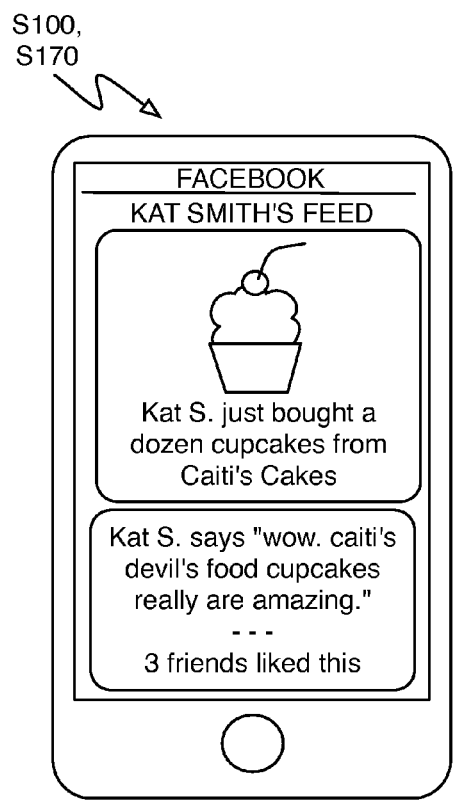

As shown in FIGS. 2 and 6B, one variation of method S100 includes Block S170, which recites posting a detail of the transaction to the social feed in accordance with a privacy setting of the user. Generally, Block S170 functions to publicize a transaction between the user and the store by posting a detail of the transaction to any one or more of a personal feed of the user, a feed of the merchant, a feed of the brand, a feed of a product line, and/or a feed of the second user, etc. The detail of the transaction can include any one or more of the name or other identifier of the user, the name or other identifier of the store or merchant, a location of the store, the brand, product line, or product name of the product purchased by the user, an ISBN, SKU number, barcode, or other identifier of the product, a discount applied to the transaction, a time or date of the transaction, a user or other review of the product, a detail of another item purchased by the user at the same time as the product, an image of the user using the product, or any other suitable or relevant detail of the transaction.

In one implementation, Block S170 posts the detail of the transaction to a social feed within the social networking system based on a correlation between the transaction and the advertisement, such as determined in Block S160. For example, if Block S160 determines that the user was influenced by the advertisement when purchasing the product from the store, Block S170 can post the transaction detail alongside or in reference to the original advertisement (or multiple advertisements). Similarly, Block S170 can post the detail of the transaction to the user's personal feed with a link to the original advertisement. Block S170 can also post the detail of the transaction to a previous post of a detail of a similar transaction by another user, thereby aggregating details of similar transactions by multiple users over time. Block S170 can therefore post the detail of the transaction in the form of a new post to a social feed within the social networking system, a comment or other response to a previous post, detail, or advertisement, an update to the advertisement, a "repost" of the advertisement, etc.

Block S170 can further prompt the user to verify or confirm the detail of the transaction prior to posting the detail to one or more social feeds within the social networking system, as shown in FIG. 6A. For example, Block S170 can enable the user to add or remove details of the transaction to customize the content of published information, such as based on a level of information with which the user is comfortable disclosing. Block S170 can also provide the user with posting options, such as a list of social feeds to which to post the detail of the transaction or an option to comment or review the transaction, store, or product.

Block S170 can further reward the user with a loyalty point, redeemable through the merchant, based on the detail of the transaction posted to the social feed. Because the user's purchase may influence another user to visit the store, to view the brand's social feed, to purchase the product, etc., Block S170 can reward the user for sharing personal transaction information. The user's reward, like the second user's reward, can be a loyalty point redeemable at the store or upon a subsequent purchase of another of the brand's products. Alternatively, the user's reward can be a social point through which the user can gain "traction" within the social networking system, such as with ranked user posts. However, Block S170 can post any other detail(s) of the transaction to any other social feed within the social networking system and according to any other schema, and Block S170 can reward the user in any other way for posting the detail(s) of the transaction.

Though described above as applicable to brick-and-mortar stores, method S100 can be similarly applicable to online shopping and online transactions, such as shopping through a web browser or native application executing on a mobile computing device (e.g., smartphone). For example, the store can be an online store, Block S150 can communicate the selected data to a server supporting the online store, and the online store can implement the selected data by modifying a layout or order of items displayed to the user, by filtering out all but items determined to be of particular interest or necessity to the user, by filtering out all but items advertised to the user and tagged with a positive response from the user, etc. In this implementation, Block S160 can similarly collect transaction data directly from the online store, such as upon user checkout. Alternatively, Block S160 can collect transaction data from a payment processing service. However, method S100 can be implemented in any other way to assess the effectiveness of an advertisement in influencing a user to initiate a transaction with an electronic or brick-and-mortar store or merchant.

2. Social Networking System

Figure 7:
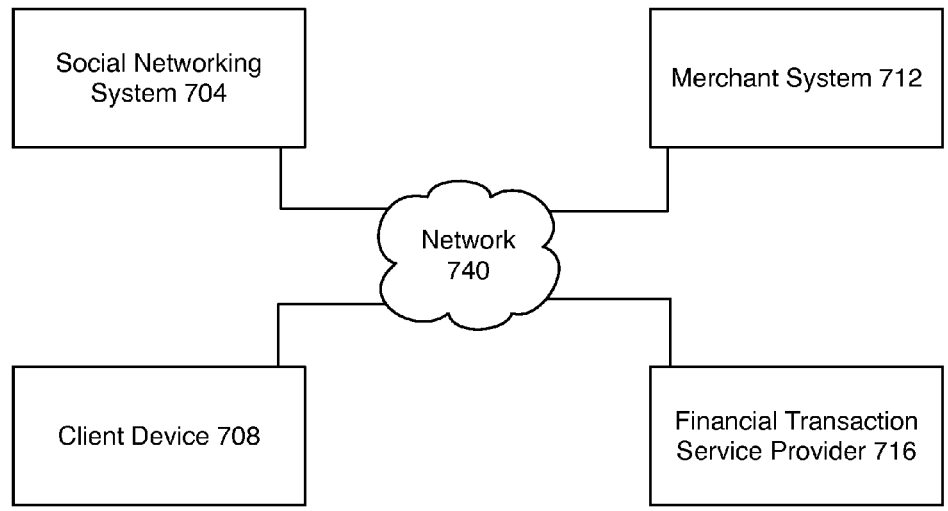
FIG. 7 is a Block diagram of a system environment for a social networking system.

FIG. 7 is a Block diagram of a system environment for a social networking system 704. The system environment, shown in FIG. 7, includes a social networking system 704, a client device 708, a merchant system 712, a financial transaction service provider 114, and a network 740. Alternatively, the system environment can include different and/or additional components than those shown in FIG. 7.

The social networking system 704, further described below in conjunction with FIG. 8, includes one or more computing devices storing user profiles associated with users and/or other objects as well as connections between users and other users and/or objects. In use, users join the social networking system 704 and then add connections to other users or objects of the social networking system to which they desire to be connected. As further described below in conjunction with FIG. 8, users of the social networking system 704 can be individuals or entities such as businesses, organizations, universities, manufacturers. The social networking system 704 allows its users to interact with each other as well as with other objects maintained by the social networking system 704. The social networking system 704 can therefore allow users to interact with third-party websites, such as the merchant system 712 and the financial transaction service provider 716. In one implementation, third-party developers can enable users of the social networking system to express interest in web pages hosted on websites external to the social networking system (e.g., third-party websites). These web pages can be represented as page objects in the social networking system as a result of embedding a widget, a social plug-in, programmable logic or code snippet into the web pages, such as an iFrame. Any concept that can be embodied in a web page can become a node in the social graph on the social networking system in this manner. As a result, users can interact with many objects external to the social networking system. Each of the interactions with an object can be recorded by the social networking system as an edge. These interactions can be used, for example, to identify a gift-appropriate event of the recipient. Enabling third-party developers to define object types and action types is further described in a related application, "Structured Objects and Actions on a Social Networking System," U.S. application Ser. No. 13/239,340 filed on Sep. 21, 2011, which is hereby incorporated by reference. In one embodiment, the interaction can be a comment associated with a content object hosted by a third party system, as further described in a related application, "Comment Plug-In for Third Party System," U.S. application Ser. No. 12/969,368 filed on Dec. 15, 2010. As such, the electronic communication may be entered into a comment field of an embedded widget, a social plug-in, programmable logic or code snippet into a third party web page, such as an iFrame Based on stored data about users, objects and connections between users and/or objects, the social networking system 704 generates and maintains a "social graph" including a plurality of nodes interconnected by a plurality of edges. Each node in the social graph represents an object or user that can act on another node and/or that can be acted on by another node. An edge between two nodes in the social graph represents a particular kind of connection between the two nodes, which can result from an action that was performed by one of the nodes on the other node. For example, when a user identifies an additional user as a friend or confirms a friend request from another user, method S100s can generate an edge in the social graph generated connecting a node representing the first user and an additional node representing the additional user. The generated edge has a connection type indicating that the users are friends. As various nodes interact with each other, the social networking system 704 modifies edges connecting the various nodes to reflect the interactions.

A client device 708 is a computing device capable of receiving user input as well as transmitting and/or receiving data via the network 740. In one implementation, the client device 708 is a conventional computer system, such as a desktop or laptop computer. In another implementation, the client device 708 can be a device having computer functionality, such as a personal digital assistant (PDA), mobile telephone, smart-phone or similar device. The client device 708 is configured to communicate with the social networking system 704, the merchant system 712 and/or the financial transaction service provider 716 via the network 740. In one implementation, the client device 708 executes an application allowing a user of the client device 708 to interact with the social networking system 704. For example, the client device 708 executes a browser application to enable interaction between the client device 708 and the social networking system 704 via the network 740. In another implementation, a client device 708 interacts with the social networking system 704 through an application programming interface (API) that runs on the native operating system of the client device 708, such as iOS or ANDROID operating system.

The client devices 708 are configured to communicate via the network 740, which can include any combination of local area and/or wide area networks, using both wired and wireless communication systems. In one implementation, the network 740 uses standard communications technologies and/or protocols. Thus, the network 740 can include links using technologies such as Ethernet, 802.11, worldwide interoperability for microwave access (WiMAX), 3G, 4G, CDMA, digital subscriber line (DSL), etc. Similarly, the networking protocols used on the network 740 can include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 740 can be represented using technologies and/or formats including hypertext markup language (HTML) or extensible markup language (XML). In addition, all or some of the links can be encrypted using conventional encryption technologies such as secure sockets layer (SSL), transport layer security (TLS), and Internet Protocol security (IPsec).

The merchant system 712 includes one or more servers providing content associated with a merchant. For example, the merchant system 712 provides web pages describing products and/or services sold by one or more vendors. The merchant system 712 can also perform other functions to allow the merchant to provide products or services in exchange for compensation. Examples of functions provided by the merchant system 712 include maintaining accounts for purchasers, tracking inventory levels, modifying pricing of products or services, obtaining compensation for products or services from the financial transaction service provider 716 and/or other suitable actions. The merchant system 712 communicates with the social networking system 704, and/or the financial transaction service provider 716 via the network 740.

The financial transaction service provider 716 processes virtual currency transactions between a merchant and a customer, such as credit, debit, private-label, gift, payroll, a prepaid card, and/or other virtual currency, credit, or debit transaction. The financial transaction service provider 716 therefore directs a fund from a financial account of a consumer to a financial account of a merchant in response to a consumer purchase and can further direct a fund from a merchant to a consumer, such as in response to a return or exchange. The financial transaction service provider 716 can further provide fraud protection and authentication solutions, electronic check acceptance services, and/or Internet commerce and mobile payment solutions.

Figure 8:
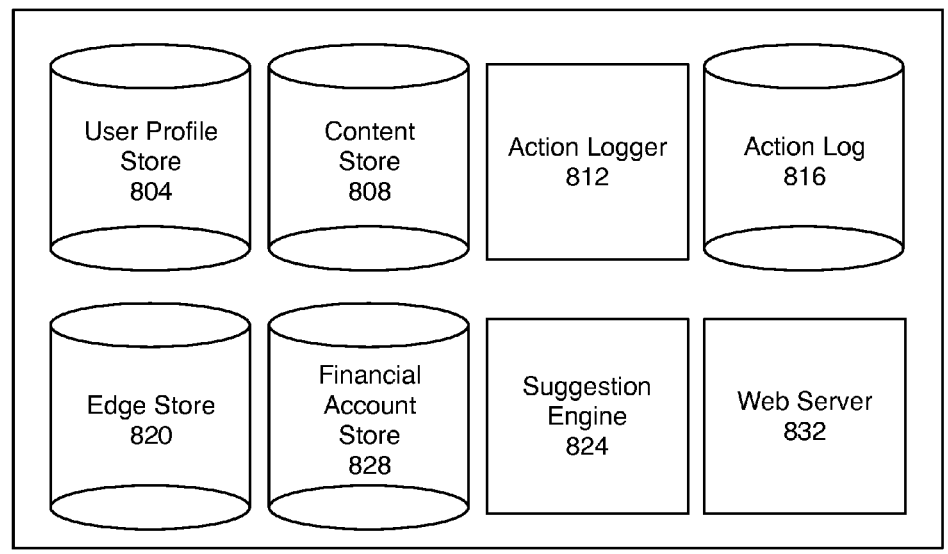
FIG. 8 is a Block diagram of a system architecture of the social networking system.

FIG. 8 is a Block diagram of a system architecture of the social networking system 704. The social networking system 704 shown in FIG. 8 includes a user profile store 804, a content store 808, an edge store 820, an action logger 214, an action log 832, a suggestion engine 824, a financial account store 828 and a web server 232. Alternatively, the social networking system 704 can include additional, fewer, or different modules for various applications. Conventional components such as network interfaces, security mechanisms, load balancers, failover servers, management and network operations consoles, and the like are not shown so as to not obscure the details of the system architecture.

Each user of the social networking system 704 is associated with a user profile, which is stored in the user profile store 804. A user profile includes declarative information about the user that was explicitly shared by the user, and can also include profile information inferred by the social networking system 704. In one implementation, a user profile includes multiple data fields, each data field describing one or more attributes of the corresponding user of the social networking system 704. The user profile information stored in user profile store 804 describes the users of the social networking system 704, including biographic, demographic, and other types of descriptive information, such as work experience, educational history, gender, hobbies or preferences, location and the like. A user profile can also store other information provided by the user, for example, images or videos. Images of users can be tagged with identification information of users of the social networking system 704 displayed in an image. A user profile in the user profile store 804 can also maintain references to actions by the corresponding user performed on content items in the content store 808 and stored in the edge store 820.

A user profile can be associated with one or more financial accounts, which enables tracking of prepaid gifts and redemption of those gifts when using an associated financial account. A user can specify one or more privacy settings, which can be stored in the user profile. The privacy settings can specify the content and quantity of (personal) user data that can be tracked, shared, and/or accessed by the social networking system 704. In one implementation, information from the financial account is stored in the user profile store 804. Alternatively, information can be stored in the financial account store 828.

The content store 808 stores content items associated with a user profile, such as images, videos or audio files. Content items from the content store 808 can be displayed when a user profile is viewed or when other content associated with the user profile is viewed. For example, displayed content items can show images or video associated with a user profile or show text describing a user's status. Additionally, other content items can facilitate user engagement by encouraging a user to expand his connections to other users, to invite new users to the system or to increase interaction with the social network system by displaying content related to users, objects, activities, or functionalities of the social networking system 704. Examples of social networking content items include suggested connections or suggestions to perform other actions, media provided to, or maintained by, the social networking system 704 (e.g., pictures or videos), status messages or links posted by users to the social networking system, events, groups, pages (e.g., representing an organization or commercial entity), and any other content provided by, or accessible via, the social networking system.

The content store 808 also includes one or more pages associated with entities having user profiles in the user profile store 804. An entity is a non-individual user of the social networking system 704, such as a business, a vendor, an organization or a university. A page includes content associated with an entity and instructions for presenting the content to a social networking system user. For example, a page identifies content associated with the entity's user profile as well as information describing how to present the content to users viewing the brand page. Merchants associated with merchant systems 712, further described above in conjunction with FIG. 7, can be associated with pages in the content store 808, allowing social networking system users to more easily interact with the merchant via the social networking system 704. A merchant identifier is associated with a vendor's page, allowing the social networking system 704 to identify the merchant and/or to retrieve additional information about the merchant from the user profile store 804, the action log 832 or from any other suitable source using the vendor identifier.

The action logger 812 receives communications about user actions on and/or off the social networking system 704, populating the action log 832 with information about user actions. Such actions can include, for example, adding a connection to another user, sending a message to another user, uploading an image, reading a message from another user, viewing content associated with another user, attending an event posted by another user, among others. Moreover, the actions can relate to a merchant. In one example, a user can "like" an object associated with the merchant, for example, by explicitly making that indication on the merchant's page in the social network. In another example, a user can comment on a merchant's page within the social network, share a story from the merchant's page, tag a photo associated with the merchant or a product or service provided by the merchant, become a fan of the merchant, check-in to a brick-and-mortar store of the merchant, or subscribe or follow the merchant. As described in U.S. patent application Ser. No. 13/239,340, which is incorporated herein by reference, the edge store 820 can correlate any one or more such user actions with an interest in the merchant or a product of service from the merchant, which can be useful in selection an appropriate gift for the user who is a recipient.

The action log 832 can be used by the social networking system 704 to track user actions on the social networking system 704, as well as external website that communicate information to the social networking system 704. Users can interact with various objects on the social networking system 704, including commenting on posts, sharing links, and checking-in to physical locations via a mobile device, accessing content items in a sequence or other interactions. Information describing these actions can be stored in the action log 832, and the extent and content of such interactions can be correlated with an affinity for the objects. Additional examples of interactions with objects on the social networking system 704 included in the action log 832 include commenting on a photo album, communications between users, becoming a fan of a musician, adding an event to a calendar, joining a group, becoming a fan of a brand page, creating an event, authorizing an application, using an application and engaging in a transaction. Additionally, the action log 832 records a user's interactions with advertisements on the social networking system 704 as well as other applications operating on the social networking system 704. Data from the action log 832 is used to infer interests or preferences of the user, augmenting the interests included in the user profile and allowing a more complete understanding of user preferences.

The action log 832 can also store user actions on external websites and/or determined from a financial account associated with the user. For example, an e-commerce website that primarily sells sporting equipment at bargain prices can recognize a user of a social networking system 704 through social plug-ins that enable the e-commerce website to identify the user of the social networking system 704. Because users of the social networking system 704 are uniquely identifiable, e-commerce websites, such as this sporting equipment retailer, can use the information about these users as they visit their websites. The action log 832 records data about these users, including webpage viewing histories, advertisements that were engaged, purchases made, and other patterns from shopping and buying, such as in accordance with privacy settings of the user. Actions identified by the action logger 812 from the transaction history of a financial account associated with the user allow the action log 832 to record further information about additional types of user actions.

In one embodiment, an edge store 820 stores information describing connections between users and other objects on the social networking system 704 as edge objects. Some edges can be defined by users, allowing users to specify their relationships with other users. For example, users can generate edges with other users that parallel the users' real-life relationships, such as friends, co-workers, partners, etc. Other edges are generated when users interact with objects in the social networking system 704, such as expressing interest in a page on the social networking system, sharing a link with other users of the social networking system, and commenting on posts made by other users of the social networking system. The edge store 820 stores edge objects that include information about the edge, such as affinity scores for objects, interests, and other users. For example, an affinity score between a user and a merchant can be stored. Affinity scores can be computed by the social networking system 704 over time to approximate a user's affinity for an object, interest, and other users in the social networking system 704 based on the actions performed by the user. Multiple interactions between a user and a specific object can be stored in one edge object in the edge store 820, in one embodiment. Connections between users can be stored in the user profile store 804, or the user profile store 804 can access the edge store 820 to determine connections between users.

In one implementation, the financial account store 828 includes financial account identifiers associated with user profiles and an association or mapping between a financial account and its corresponding user profile. A user can include additional information about the financial account in the financial account store, such as a description of the financial account and can also include authentication information for accessing the account such as names, passwords or other security credentials. In implementation in which information about user financial accounts are stored in the financial account store 828, the social networking system 704 can apply additional security measures (encryption, etc.) to the financial account store 828 to reduce the risk of unauthorized access to financial account information. Alternatively, financial account information can be included in the user profile store 804 as data in a user's user profile. One or more privacy settings can be applied to the financial account information to limit its accessibility to objects in the social networking system 704.

The suggestion engine 824 accesses data in the user profile store 804, user profile store 804, in the action log 832, and/or the content store 808 either individually or in combination and identifies one or more candidate products associated with vendors in which a user is likely to have an interest. Generally, the suggestion engine can analyze the action log 832, identify user actions related to one or more merchants, products, or services, calculate the user's affinity for one or more merchants, products, or services, and select a suitable gift for the user based on the user's affinity. The suggestion engine 824 can also collect offers for products from local merchants, wherein the products can be collected or fulfilled through a physical retail location and/or through e-commerce. The suggestion engine 824 can further calculate an affinity between a user who is a (potential) recipient and a second user who is a (potential) sender, such as based on interactions between the users including messages, posts, and/or other communications between the users within the social networking system, and select the second user as the sender based on the affinity between the users. The suggestion engine 824 can subsequently recommend the selected gift to the sender and facilitate sender purchase of the product for the recipient.

Actions between the user and pages maintained by the social networking system stored in the action log 832 can be used by the suggestion engine 824 to select candidate products. The suggestion engine 824 can analyze actions involving the user and various pages in the content store 808 as well as connections between the user and various pages in the edge store 820 to select candidate products. For example, the suggestion engine 824 selects candidate products based on the frequency of actions between the user and a page, the number of interactions between the user and the page, the type of connection between the user and a page, staleness of the interactions, a type of action between the user and a page or any other suitable criteria.

The financial account store 828 can store a financial account identifier of one or more user IDs or profiles within the social networking system. The financial account store 828 can cooperate with the financial transaction service provider to track gifts, gift values, gift description, gift contents, etc. for a particular merchant and control application of a gift to a recipient purchase based on an identified match between a gift and a recipient purchase at the particular merchant. For example, the financial account store 828 can analyze merchant transactions, match a user social network ID to the purchase, and select an available gift affiliated with the user and redeemable at the merchant. The financial account store 828 can then communicate this information to the financial transaction service provider to initiation deduction of the gift amount from the recipient's bill without exposing user (e.g., sender or recipient) identification information to the financial transaction service.

The web server 232 links the social networking system 704 via the network 740 to the client device 708, to the financial transaction service provider 716 and/or to the merchant system 712. The web server 232 serves web pages, as well as other web-related content, such as Java, Flash, XML and so forth. The web server 232 can provide the functionality of receiving and routing communications between the social networking system 704 and the client device 708, for example, instant messages, queued messages (e.g., email), text and SMS (short message service) messages, or messages sent using any other suitable messaging technique. A user can send a request to the web server 232 to upload information, for example, images or videos that are stored in the content store 808. Additionally, the web server 232 can provide application programming interface (API) functionality to send data directly to native client device operating systems, such as iOS, ANDROID, webOS, or RIM operating system. The web server 232 also provides API functionality for exchanging data, such as financial account information, between the social networking system 704 and the financial transaction service provider 716.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
    posting an advertisement for a product to a social feed within a social networking system;
    detecting, by at least one processor, that a user views the advertisement;
    determining, by the at least one processor, that a mobile device associated with the user is within a threshold proximity of a physical store of a merchant;
    in accordance with a privacy setting of the user, identifying personal data of the user from data stored in the social networking system, the personal data comprising an identity of the user and an interest of the user;
    in response to the mobile device associated with the user being within the threshold proximity of the physical store and in accordance with the privacy setting of the user, transmitting the identified personal data to the physical store;
    identifying a transaction between the user and the physical store;
    in response to the mobile device associated with the user being within the threshold proximity of the physical store and to the transaction between the user and the physical store, determining an effectiveness of the advertisement based on a correlation between the transaction and the user viewing the advertisement; and
    establishing a threshold number of times to post a future advertisement to the user via the social networking system based on the determined effectiveness of the advertisement and a number of times the user views the advertisement, wherein the established threshold number of times to post the future advertisement via the social networking system improves the effectiveness of advertisement placement on the social networking system.

2. The method of claim 1, wherein posting the advertisement for the product to the social feed comprises posting an official advertisement, curated by the merchant, to a feed of the merchant, and wherein detecting that the user views the advertisement comprises detecting that the user views the advertisement on the feed of the merchant within the social networking system.

3. The method of claim 1, wherein posting the advertisement for the product to the social feed comprises posting an official advertisement to a personal feed of the user within the social networking system, the official advertisement curated by the merchant.

4. The method of claim 1, wherein establishing the threshold number of times to post a future advertisement to the user comprises reducing the threshold number of times to post the future advertisement.

5. The method of claim 4, further comprising recommending, to the merchant, one or more advertisements of the product to serve to the user based on a browsing history of the user within the social networking system and based on a positive user response to a previous post on the social feed within the social networking system that identifies an item similar to the product identified in the advertisement for the product.

6. The method of claim 4, further comprising recommending, to the merchant, one or more advertisements of the product to serve to the user based on a browsing history of the user within the social networking system and based on a user subscription to a feed of the merchant on the social networking system.

7. The method of claim 1, wherein detecting that the user views the advertisement comprises determining that the user views the advertisement for a period of time greater than a specified threshold comprehension time.

8. The method of claim 1, wherein determining that the mobile device associated with the user is within the threshold proximity of the physical store comprises determining a location of the mobile device associated with the user via a sensor on the mobile device.

9. The method of claim 1, wherein determining that the mobile device associated with the user is within the threshold proximity of the physical store comprises receiving, via the mobile device, a user check-in at the physical store via the social networking system.

10. The method of claim 1, further comprising
identifying a user need based on the personal data identified in the social networking system; and
defining a target user experience customized for the merchant of the physical store according to the identified user need;
wherein determining the effectiveness of the advertisement is further based on a correlation between the transaction and the user need.

11. The method of claim 1, wherein determining the effectiveness of the advertisement based on the correlation between the transaction and the user viewing the advertisement comprises correlating the transaction with the user viewing the advertisement based on a similarity between an object of the transaction and the product identified in the advertisement.

12. The method of claim 1, wherein determining the effectiveness of the advertisement based on the correlation between the transaction and the user viewing the advertisement comprises correlating the transaction with the user viewing the advertisement based on the user purchasing the product identified in the advertisement posted to the social feed.

13. The method of claim 1, further comprising posting a detail of the transaction to the social feed in accordance with the privacy setting of the user.

14. The method of claim 13, wherein posting the detail of the transaction to the social feed comprises posting a link to the advertisement based on the determined correlation between the transaction and the user viewing the advertisement.

15. The method of claim 13, further comprising rewarding the user with a loyalty point, redeemable through the merchant, upon the detail of the transaction being posted to the social feed.

16. A non-transitory computer readable medium storing instructions thereon that, when executed by at least one processor, cause a computer system to:
post an advertisement for a product to a social feed within a social networking system;
detect that a user views the advertisement;
determine that a mobile device associated with the user is within a threshold proximity of a physical store of a merchant;
in accordance with a privacy setting of the user, identify personal data of the user from data stored in the social networking system, the personal data comprising an identity of the user and an interest of the user;
in response to the mobile device associated with the user being within the threshold proximity of the physical store and in accordance with the privacy setting of the user, transmit the identified personal data to the physical store;
identify a transaction between the user and the physical store;
in response to the mobile device associated with the user being within the threshold proximity of the physical store and to the transaction between the user and the physical store, determine an effectiveness of the advertisement based on a correlation between the transaction and the user viewing the advertisement; and
establish a threshold number of times to post a future advertisement to the user via the social networking system based on the determined effectiveness of the advertisement and a number of times the user views the advertisement, wherein the established threshold number of times to post the future advertisement via the social networking system improves the effectiveness of advertisement placement on the social networking system.

17. The non-transitory computer readable medium of claim 16, wherein determining that the mobile device associated with the user is within the threshold proximity of the physical store comprises determining a location of the mobile device associated with the user via a sensor on the mobile device.

18. The non-transitory computer readable medium of claim 17, wherein the sensor on the mobile device is a GPS sensor that receives location data corresponding to the location of the mobile device associated with the user.

19. The non-transitory computer readable medium of claim 17, wherein the sensor on the mobile device is a cellular sensor that receives location data corresponding to the location of the mobile device associated with the user.

20. The non-transitory computer readable medium of claim 17, wherein the sensor receives location data by triangulating the location of the mobile device using a plurality of cellular towers within range of the mobile device.

21. A system comprising:
at least one processor; and
at least one non-transitory computer readable storage medium storing instructions thereon that, when executed by the at least on processor, cause the system to:
post an advertisement for a product to a social feed within a social networking system;
detect that a user views the advertisement;
determine that a mobile device associated with the user is within a threshold proximity of a physical store of a merchant;
in accordance with a privacy setting of the user, identify personal data of the user from data stored in the social networking system, the personal data comprising an identity of the user and an interest of the user;
in response to the mobile device associated with the user being within the threshold proximity of the physical store and in accordance with the privacy setting of the user, transmit the identified personal data to the physical store;
identify a transaction between the user and the physical store;

in response to the mobile device associated with the user being within the threshold proximity of the physical store and to the transaction between the user and the physical store, determine an effectiveness of the advertisement based on a correlation between the transaction and the user viewing the advertisement; and establish a threshold number of times to post a future advertisement to the user via the social networking system based on the determined effectiveness of the advertisement and a number of times the user views the advertisement, wherein the established threshold number of times to post the future advertisement via the social networking system improves the effectiveness of advertisement placement on the social networking system.

* * * * *